United States Patent [19]

Dorpfeld et al.

[11] Patent Number: 5,449,240

[45] Date of Patent: Sep. 12, 1995

[54] APPARATUS FOR EMBOSSING BRAILLE LABELS

[76] Inventors: Wayne L. Dorpfeld, 3013 E. Shelby Rd., Oakfield, N.Y. 14125; Robert W. Williams, 4724 Ayers Rd., Akron, N.Y. 14001; Arnold R. Wolfe, 514 Beach Dr., Medina, N.Y. 14103

[21] Appl. No.: 996,325

[22] Filed: Dec. 23, 1992

[51] Int. Cl.[6] .................................... B41J 3/38
[52] U.S. Cl. ...................................... 400/427; 101/3.1
[58] Field of Search ................ 400/127, 129, 132, 122, 400/131; 101/31, 4, 32; 409/86; 434/113-117

[56] References Cited

U.S. PATENT DOCUMENTS

| | | | |
|---|---|---|---|
| 455,732 | 7/1891 | Beckwith et al. | 400/131 |
| 506,718 | 10/1893 | Orndorff | 101/3.1 |
| 2,565,608 | 8/1951 | Hoff | 101/3.1 |
| 3,351,003 | 11/1967 | McCoy | 400/127 |
| 3,496,795 | 2/1970 | Dinnendahl | 33/25.1 |
| 3,570,129 | 3/1971 | Del Vecchio | 33/25.2 |
| 3,756,153 | 9/1973 | Cohen | 101/368 |
| 4,079,825 | 3/1978 | Fewell | 400/122 |
| 4,500,236 | 2/1985 | Plotkin | 33/25.2 |
| 4,905,741 | 3/1990 | Jaeger | 409/182 |

*Primary Examiner*—Edgar S. Burr
*Assistant Examiner*—Anthony H. Nguyen
*Attorney, Agent, or Firm*—Jaeckle, Fleischmann & Mugel

[57] ABSTRACT

An apparatus for manually embossing a Braille label, comprising a work platform, means for securing a label to be embossed to the platform, an embossing lever movably secured to the platform, the lever having an embossing pin extending therefrom, wherein the lever is operatively arranged to be moved to cause the pin to emboss the label; and, means for precisely positioning the embossing pin above the label.

8 Claims, 3 Drawing Sheets

APPARATUS FOR EMBOSSING BRAILLE LABELS

BACKGROUND OF THE INVENTION

The invention relates generally to an apparatus for embossing labels, and, more particularly, to an apparatus for embossing Braille labels.

Braille is a well-known system of writing for the blind which uses combinations of raised dots which are read by the fingers. The method was developed by a French teacher of the blind, Louis Braille, and was first introduced in 1824.

The Braille system uses "Braille cells", each of which comprises six dots arranged in two vertical rows of three dots each. Sixty three different dot patterns can be formed by the six dots, and twenty six of these have been assigned letters of the Roman alphabet. Other combinations represent numerals, punctuation, etc. A table of the Braille alphabet and numerals is reproduced herebelow:

BRAILLE ALPHABET AND NUMERALS a b c d e f g h i j k l m n o p q r s t u v w x y z

, ; : . ! ( ) "? "

NUMERAL SIGN - ' CAPITAL SIGN 1 2 3 4 5 6 7 8 9 0

1 • • 4
2 • • 5
3 • • 6

Recently enacted federal legislation mandates sweeping reforms designed to assist the visually impaired. The Americans with Disabilities Act, hailed as the most far-reaching civil rights legislation in recent history, was signed into law in 1990, with portions of the law taking effect in 1992, 1993 and 1994. In a nutshell, the law requires businesses which serve the public to remove barriers and become more accessible to the disabled.

Businesses affected by the law include shopping malls, health-care providers, banks, movie theaters, museums, schools, health clubs, restaurants and hotels and other public accommodations.

An important part of the law mandates the use of Braille or raised letter signs. Under the guidelines, signs designating handicapped parking spaces, passenger loading zones and van accessible spaces must be in Braille. Handicapped accessible entrances also must have Braille signs, as must those leading into public transportation facilities such as bus stations or airports.

Interior signs such as room numbers and names, identification of places within the building, directional and informational signs must be in Braille or raised letters. Elevators must also have Braille or raised lettering.

Quite simply, the Americans with Disabilities Act has created a niche in the signage industry which did not previously exist. In particular, with respect to the Braille and raised character requirements, the law requires:

Raised and Brailled Characters and Pictorial Symbol Signs (Pictograms)

Letters and numerals shall be raised 1/32 in, upper case sans serif or simple serif type and shall be accompanied with Grade 2 Braille. Raised characters shall be at least ⅝ in (16 mm) high, but no higher than 2 in (50 mm). Pictograms shall be accompanied by the equivalent verbal description placed directly below the pictogram. The border dimension of the pictogram shall be 6 in (152 mm) minimum in height.

Federal Register/Vol. 56, No. 144/Friday, Jul. 26, 1991, Section 4.30.4 at page 35659.

Presently, there are several different methods and machines which are capable of making acceptable Braille signs which meet ADA requirements. Unfortunately, all of the available machines are simply too expensive for small sign shops. The methods have other disadvantages as well.

In one method, a computer-directed X-Y router is used to cut the Braille into plastic. A large amount of material is cut away, leaving only the raised Braille dots where desired. Unfortunately, these machines are very expensive, usually in the range of $ 21,000 to $ 27,000, beyond the range of many small sign shops.

Another method is that of acid etching into magnesium. This system is inherently hazardous, is very costly because of the acid holding tanks and related equipment, and requires expensive ventilation systems as well. Moreover, the system is limited to metal work.

Still another method is that of forming with PCV plastic. This is a very time consuming method which requires two basic pieces of equipment. First, a Braille embosser capable of embossing 100# paper stock to create a mold. Then, a vacuum form machine is used to form the PVC over the paper. The finished product is thick and bulky.

Still a further method uses a computer-controlled X-Y embosser. In this method, a sheet of sign stock is placed on a table with a piece of rubber underneath. The computer program moves a male embossing die across the work piece and embosses at a relatively high rate of speed, one dot at a time. There are several disadvantages to this system. First, the machine is very expensive, usually in the range of $ 17,000 to $ 20,000. Second, the sheet must be cut perfectly after embossing to separate the Braille legends. The quality of the embossing is not high because no female die is placed underneath the workpiece during embossing.

Finally, injection molding may be used but is extremely costly. Individual molds typically cost thousands of dollars and are useful only in producing many identical signs. This is simply impractical for the small sign shop which must produce a variety of signs.

Thus, it is seen that a need exists for a new method of embossing Braille labels, which labels preferably meet the requirements of the Americans With Disabilities Act. The new method should be inexpensive and simple to implement.

BRIEF SUMMARY OF THE INVENTION

The present invention is an apparatus for manually embossing a Braille label, including a work platform, means for securing a label to be embossed to the platform, an embossing lever movably secured to the platform, the lever having an embossing pin extending therefrom, wherein the lever is operatively arranged to cause the pin to emboss the label, and, means for precisely positioning the embossing pin above the label.

A primary object of the invention is to provide an inexpensive and easy to use manual embosser for creating Braille labels, including all recognized Grade 1 and Grade 2 Braille.

DETAILED DESCRIPTION OF THE INVENTION

Figure 1:
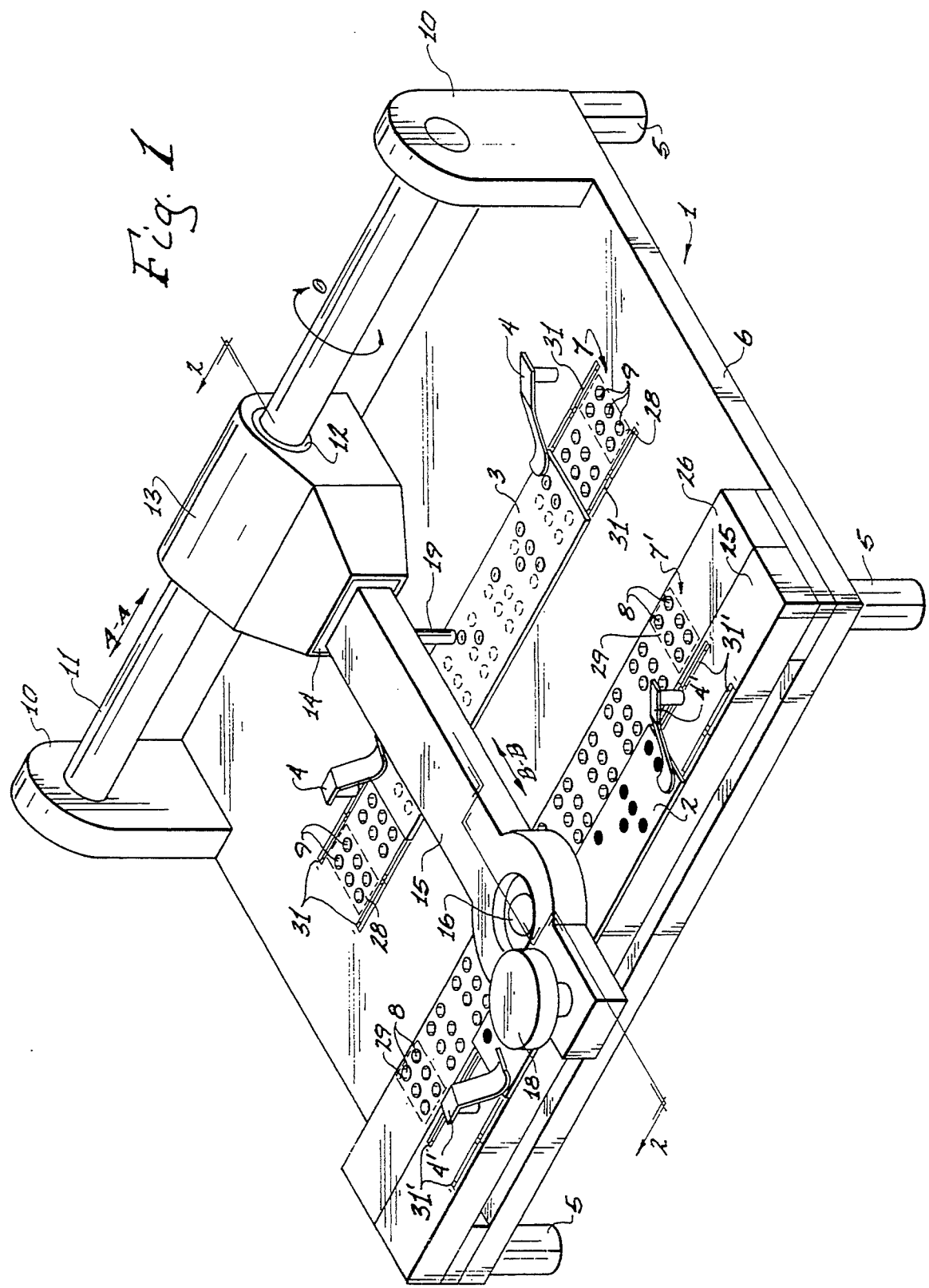
FIG. 1 is a perspective view of the embosser apparatus of the invention.

FIG. 1 is a perspective view of the Braille label embosser 1 of the invention. The apparatus broadly comprises work platform 6 supported by feet 5, means for securing a label to be embossed 4, and embossing lever 15.

The lever is secured to lever housing 13 which, in turn, is slidably mounted to guide shaft 11 and rides on the shaft through bearing 12. The guide shaft is secured at both ends by supports 10. The lever is operatively arranged to move back and forth along the guide shaft in the direction A—A shown in FIG. 1. The lever is also operatively arranged to move into and out of the housing in the direction B—B as shown in FIG. 1. Finally, the lever is operatively arranged to rotate about guide shaft 11 in the direction Θ as shown in FIG. 1.

The label to be embossed 3 is held in place on the platform by the securing means 4 above a first female die pattern 7. The first female die pattern 7 comprises a plurality of equally spaced cells 28 which extend across the platform in a single row which is parallel to the guide shaft. Each cell comprises six depressions 9 which correspond to dots in a standard Braille cell.

Mounted on the underside of lever 15 is embossing pin 19, which is used to emboss the label. Secured to the top side of the lever is knob 18 which is held by the operator to guide the lever and embossing pin during positioning and embossing.

Integral with lever 15 is sight glass 16 which may be a magnifier having crosshairs for precise positioning of the lever and embossing pin. Directly under the sight glass is Braille pattern 2 which is secured to first riser block 25 by retaining means 4'. Riser block 25 is in turn permanently mounted to platform 6. In a preferred embodiment, riser block 25 is clear, i.e., transparent. It may be constructed of glass, polycarbonate, clear acrylic, or any other suitable material. Mounted adjacent and parallel to first riser block 25 is second riser block 26 which contains second female die pattern 7'.

Pattern 7' comprises a plurality of equally spaced alignment cells 29 which extend across the platform in a single row which is parallel to and perfectly aligned with the first female die pattern. Each alignment cell comprises six depressions 8 which correspond to dots in a standard Braille cell.

Figure 2:
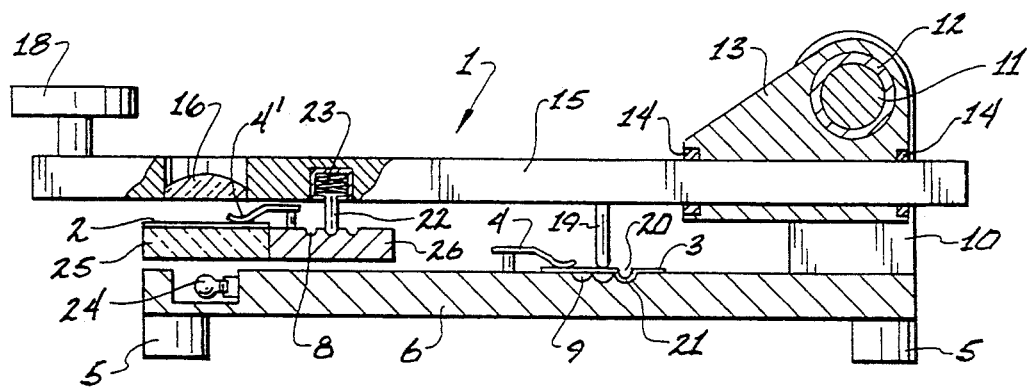
FIG. 2 is a side cross-sectional view of the apparatus of FIG. 1 taken generally along line 2—2.

Adverting to FIG. 2, which is a partial side crosssectional view taken generally along line 2—2 in FIG. 1, it is seen that an indexing pin 22 is mounted in a spring-loaded manner to the underside of lever 15. Also shown in FIG. 2 is lightbulb 24 mounted directly beneath clear first riser block 25.

Figure 3:
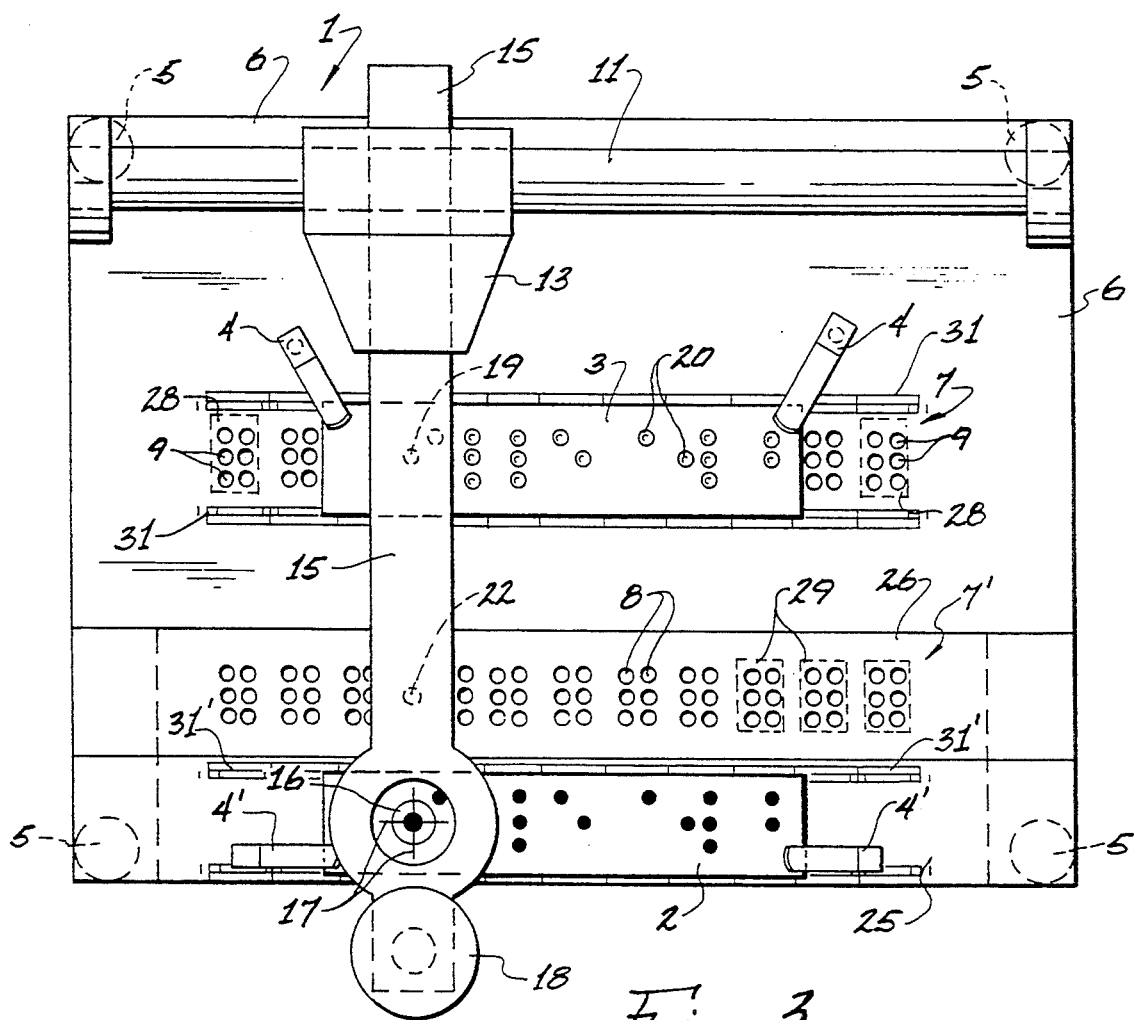
FIG. 3 is a top view of the invention as shown in FIG. 1.

Operation of the apparatus is best understood with reference first to FIG. 3. A translucent Braille pattern 2 is secured to riser block 25 by retaining means 4'. This pattern contains an inverted replica of the Braille to be produced on the label. The pattern may be produced by any conventional means, such as a computer controlled laser printer driven by software which converts ordinary words, characters, numerals, etc. to Braille. In a preferred embodiment, the pattern is translucent, i.e., paper, mylar or the like, and the dots are printed on the pattern.

After the Braille pattern is secured, the operator would next secure a label to be embossed using retaining means 4. This label 3 should be placed on the platform so that the label is parallel with pattern 2. Otherwise, the label may have to be trimmed to ensure that the Braille cells are aligned with the edges of the label. Proper alignment of label 3 is aided by grid 31 which is scribed into platform 6. Proper alignment of pattern 2 is aided by grid 31' which is scribed into riser block 25. Both grids contain vertical and horizontal lines to assist in alignment.

Once the pattern 2 and label 3 are secure, the operator merely positions the crosshairs 17 of the sight glass 16 directly above a dot on pattern 2. This is done by moving the lever into or out of housing 13, and by moving the lever back and forth as necessary on guide shaft 11. When the crosshair is directly over a selected dot, indexing pin 22 (also shown in FIG. 2) will be forced by spring 23 into a depression 8 of a Braille cell 29 on riser block 26. Since die pattern 7 is perfectly aligned with die pattern 7', the embossing pin 19 is assured of correct position as long as indexing pin 22 has snapped into a proper depression in pattern 7'. It is important to note in FIG. 2 that indexing pin 22 is closer to riser block 26 and female die pattern 7' than embossing pin 19 is to embossing pattern 7. Thus, the operator receives positive feedback via indexing pin 22 to indicate that embossing pin 19 is properly aligned.

Once proper alignment and positioning has been achieved, the operator depresses lever 15 with knob 18 which drives embossing pin 19 downward toward platform 6 and into an appropriate depression 9. This action thus creates a dimple 20 (shown in FIGS. 2 and 3) in label 3. It should be noted that, as lever 15 is depressed, indexing pin 22 is forced upwardly into lever 15. Thus, indexing pin 22 is arranged to be normally biased downwardly toward the platform by spring 23, but may also be forced upwardly into the lever when the lever is depressed.

To facilitate proper alignment, lightsource 24 functions as a backlight to illuminate pattern 2. This is an optional element and may be omitted if desired.

Figure 4:
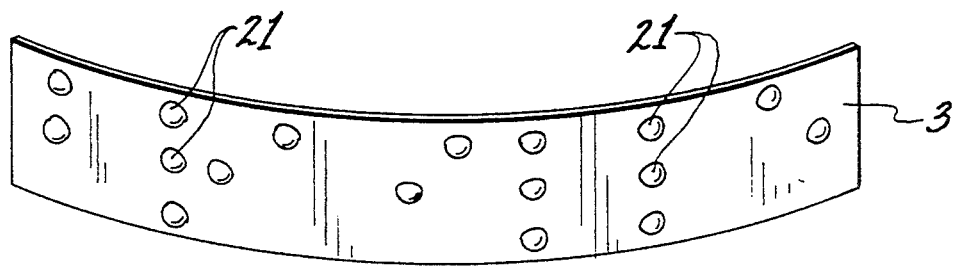
FIG. 4 is a view of the Braille label produced by the invention.
Figure 5:
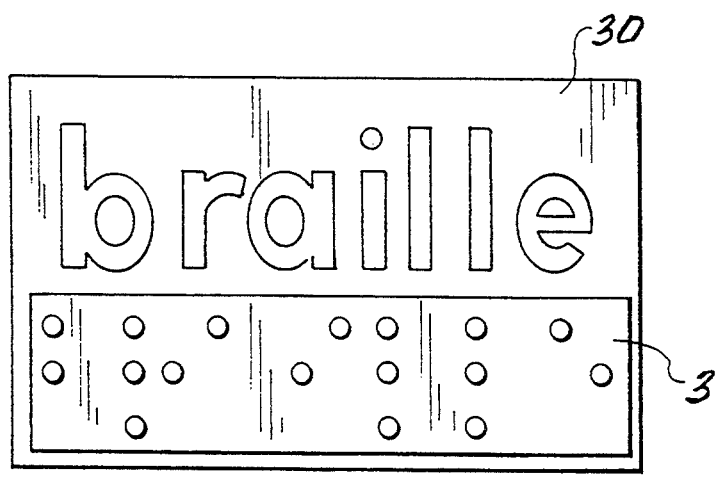
FIG. 5 is a view of a sign and associated Braille label.

As shown in FIG. 3, the operator has proceeded to emboss label 3 from right to left, duplicating the Braille on pattern 2 on label 3. The finished product is shown in FIG. 4 as a label 3 containing Braille cells comprised of raised bumps 21. The label is shown as mounted beneath corresponding Roman letters on sign 30.

Although the present invention has been described herein with a certain degree of particularity, it is to be understood that the present disclosure has been made as an exemplification of the preferred embodiment of the present invention, and the scope thereof is not considered limited by that description, but rather, is defined by what is hereinafter claimed.

What is claimed is:

1. An apparatus for manually embossing a Braille label, comprising:
   a work platform;
   means for securing a label to be embossed to said platform;
   an embossing lever movably secured to said platform, said lever having an embossing pin extending therefrom, wherein said lever is operatively arranged to be moved to cause said pin to emboss said label; and,
   means for precisely positioning the embossing pin above said label, wherein said means for precisely positioning the embossing pin above said label comprises:
      means for affixing a Braille pattern to said platform;
      a sightglass integral with said lever and positionable above said pattern for the purpose of aligning said embossing pin over said label with dots on said Braille pattern;
      a second female die pattern mounted to said platform, which second pattern includes a plurality of equally spaced cells, where each cell comprises six depressions corresponding to dots in a standard Braille cell; and,
      a spring-loaded indexing pin mounted to said lever and operatively arranged to be moved into and out of the depressions in said second pattern, to precisely align said embossing pin over said label with dots on said Braille pattern.

2. An apparatus for manually embossing a Braille label, comprising:
   a work platform;
   means for securing a label to be embossed to said platform;
   an embossing lever movably secured to said platform, said lever having an embossing pin extending therefrom, wherein said lever is operatively arranged to be moved to cause said pin to emboss said label;
   means for precisely positioning the embossing pin above said label;
   a guide shaft mounted to said platform, wherein said embossing lever is slidably mounted to said shaft to facilitate movement of said lever in two directions back and forth across said platform;
   wherein said embossing lever is also mounted to said guide shaft to facilitate movement of said lever in four directions across said platform; and,
   wherein said means for precisely positioning the embossing pin above said label comprises:
      means for affixing a Braille pattern to said platform;
      a sightglass integral with said lever and positionable above said pattern for the purpose of aligning said embossing pin over said label with dots on said Braille pattern;
      a second female die pattern mounted to said platform, which second pattern includes a plurality of equally spaced cells, where each cell comprises six depressions corresponding to dots in a standard Braille cell; and,
      a spring-loaded indexing pin mounted to said lever and operatively arranged to be moved into and out of the depressions in said second pattern, to precisely align said embossing pin over said label with dots on said Braille pattern.

3. Apparatus as recited in claim 2 wherein said plurality of equally spaced cells and depressions on said second female die pattern are located in exactly the same position on said second female die as the plurality of equally spaced cells and depressions on said first female die pattern, and said first and second female die patterns are aligned on said platform, so that when said indexing pin is aligned with a depression in said second female die pattern, said embossing pin is aligned with a corresponding depression in said first female die pattern.

4. Apparatus as recited in claim 2 wherein said indexing pin is arranged to contact a depression in said second female die pattern when said lever is depressed before said embossing pin contacts said label, and said indexing pin is operatively arranged to retract into said lever as the embossing pin embosses said label.

5. An apparatus for manually copying a Braille recorded pattern onto a label comprising:
   a work platform;
   means for securing a label to be embossed to said platform;
   an embossing lever movably secured to said platform, said embossing lever only having a single embossing pin extending therefrom, said lever being operatively arranged to be moved to cause said pin to emboss said label;
   means for affixing a Braille pattern to be copied to said platform, wherein said pattern comprises one or more Braille cells, wherein each cell comprises zero to six dots in a specific orientation; and
   means for determining the position of the dots on said pattern and for precisely positioning the embossing pin above said label to reproduce the Braille pattern on said label, where there results a one-to-one correspondence between the dots on said pattern and depressions on said label created by said single embossing pin during embossing.

6. An apparatus as recited in claim 5 wherein said work platform includes a first female die pattern located thereon, which first pattern includes a plurality of equally spaced cells, where each cell comprises six depressions corresponding to dots in a standard Braille cell, wherein said label is placed above said first female die pattern during embossing.

7. Apparatus as recited in claim 5, and further including a guide shaft mounted to said platform, wherein said embossing lever is slidably mounted to said shaft to facilitate movement of said lever in two directions back and forth across said platform.

8. Apparatus as recited in claim 7 wherein said embossing lever is also mounted to said guide shaft to facilitate movement of said lever in four directions across said platform.

* * * * *